No. 652,092. Patented June 19, 1900.
C. DESPREZ & G. L. DUTHUIT.
VARIABLE DIAMETER PULLEY.
(Application filed Jan. 31, 1900.)
(No Model.)
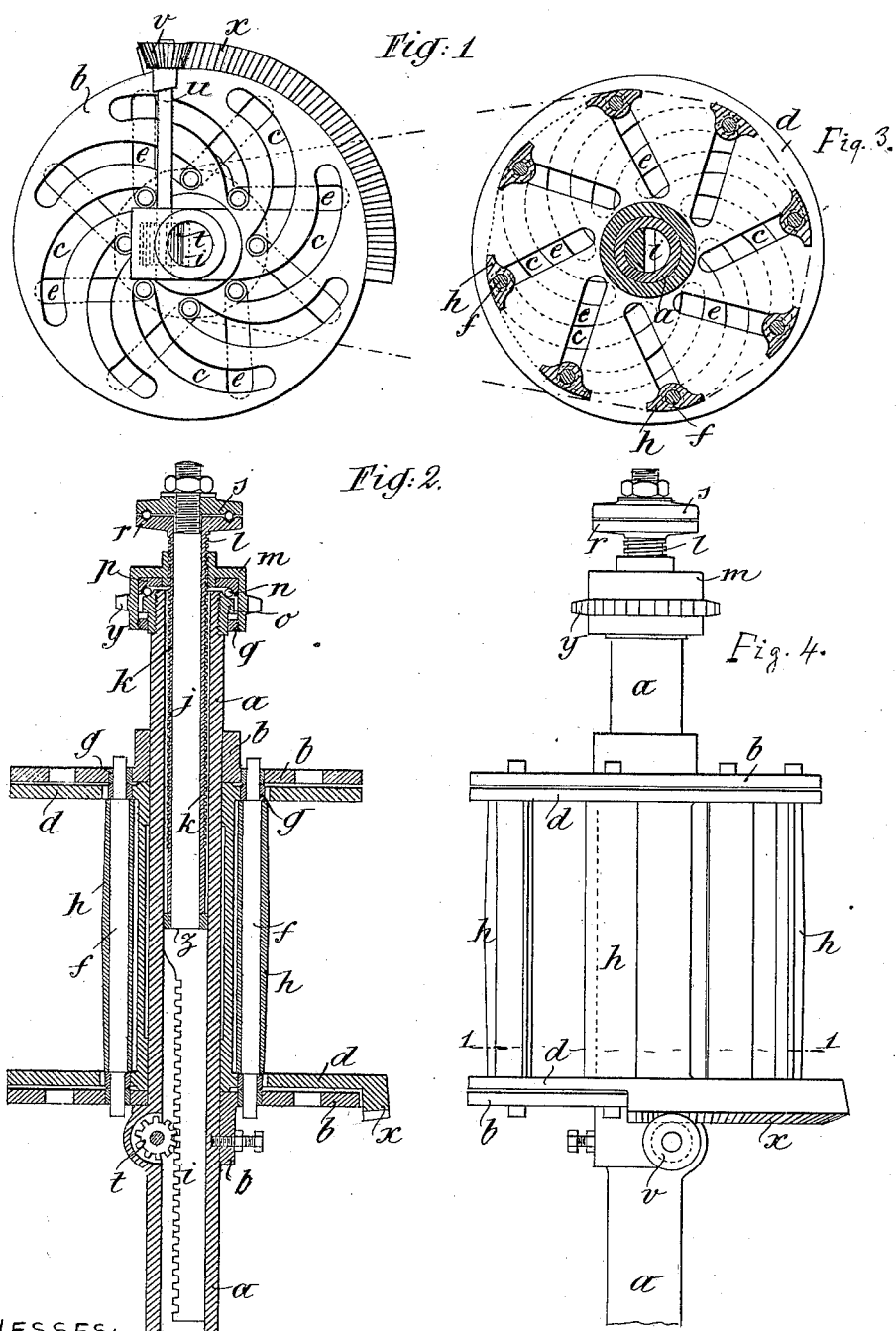

UNITED STATES PATENT OFFICE.

CHARLES DESPREZ AND GEORGES LOUIS DUTHUIT, OF PARIS, FRANCE.

VARIABLE-DIAMETER PULLEY.

SPECIFICATION forming part of Letters Patent No. 652,092, dated June 19, 1900.

Application filed January 31, 1900. Serial No. 3,424. (No model.)

*To all whom it may concern:*

Be it known that we, CHARLES DESPREZ and GEORGES LOUIS DUTHUIT, engineers, of 34 Rue Pétrelle, Paris, France, have invented a certain new and useful Variable-Diameter Pulley, of which the following is a full, correct, and clear specification.

This invention relates to a pulley for transmitting power by means of straps, cords, or the like, which pulley can be varied in diameter as desired. Such a pulley allows us to construct transmitting mechanism of changeable speed with a driving-shaft and a driven shaft each furnished with a similar pulley, the control of these pulleys being effected simultaneously in order to increase the diameter of one of them, correspondingly decreasing the diameter of the other.

In order to clearly set forth our invention, we shall describe the same with reference to the annexed drawings, which illustrate an arrangement of two such pulleys.

In the accompanying drawings, Figure 1 is an end view of the pulley. Fig. 2 is a longitudinal section of the same. Fig. 3 is a transverse section, and Fig. 4 is a plan view.

This variable-diameter pulley comprises a shaft $a$, which is the driving or driven shaft, upon which are keyed or otherwise fixed at a suitable distance apart two disks or plates $b\ b$, in which are formed curved grooves $c\ c\ c$. Against these disks $b\ b$ and upon the opposite or inner sides are situated other plates $d\ d$, in which are formed straight grooves $e\ e\ e$, arranged in a suitable direction, so as to be transverse to the direction of the grooves in the plates $b$. Between the inner plates $d$ are placed rods or pillars $f$, corresponding in number with that of the grooves. These rods are furnished at their ends with small rollers $g\ g$, by means of which they reach at either end the point of intersection of the grooves in the juxtaposed plates $b$ and $d$, the two extreme positions of these rods $f$ being determined by the coincidence of the extremities of the grooves in the plates $d$ with those of the corresponding plates $b$.

Upon the pillars or rods $f$ are located sleeves having an enlarged portion $h$, such that when the rods are at the bottom of the grooves in their nearest position to the center of the plates or disks the sleeves $h\ h$ are in juxtaposition at their enlarged portions and form a cylinder.

It will be understood that if we move the two carrier-plates $d$ in a suitable direction upon the fixed plates $b$ the points of intersection of the grooves $c$ with the grooves $e$ can occupy a number of positions from the nearest position to the axis to the most distant therefrom. Since the pairs of grooves are similarly placed, their points of intersection are always all situated in the same circle or circumference and the spindles or rods $f\ f$ therefore form a cylindrical surface whose diameter can extend from the minimum to the maximum by means of the variation of the diameter of the crown or ring of intersecting points obtained as just described. It will be remarked that this arrangement of the grooves of the two plates is such that they cross one another and intersect and that this insures in every position a secure or certain support for the bearings of the rods $f$ and that these latter cannot move back toward the center by means of the pressure exercised by the strap, cord, or the like. Their position is wholly dependent upon the movement of the set of plates $d$. The movement of these plates $d$ with relation to the plates $b$ for the purpose of varying the diameter of the cylinder afforded by the pillars or rods $f$ is operated by means of the following arrangement: The shaft $a$, upon which is mounted the system described above, is hollow, and within the same is located a rack $i$, integral with a rod $j$. Upon this latter is arranged frictionally a sleeve $k$, having upon its outer surface at $l$ a screw-thread by means of which a cap $m$ is secured thereto, said cap having approximately the form of an inward cup of a bicycle-hub and which cap is supported, by means of a ring of balls $n$, against the end of the hollow shaft $a$, the said row of balls being contained between the cone and cup $o\ p$, respectively, secured to the shaft $a$ and the cap or cover $m$. The interior cavity of the cap $m$ is completely boxed or closed in by a screw-threaded ring $q$, which is exactly adjusted upon the end of the cone $o$. The sleeve $k$ terminates in a small disk or head $r$, separated by means of a ring of balls from another disk $s$, secured to the rod $j$. The rack $i$ is engaged by a pinion $t$, mounted upon a short shaft $u$, suitably journaled, and which extends to the circumference of the plates $b$ and $d$ at this side and carries at its outer end a bevel-pinion $v$, engaging a suitably-toothed segment or portion of a toothed crown $x$, in one piece with the plate $d$. By means of this arrangement when the cap $m$ is turned in one direction or the other a movement of the sleeve $k$ takes place. This latter moves the rod $j$ in one direction or the other, and consequently the rack $i$, either by means of the disk $s$, driven by the disk $r$, or by bearing against the shoulder $z$, formed between the rod $j$ and rack $i$.

The rotation of the cap $m$ can be effected in any convenient manner—for instance, by a chain passing over a sprocket-wheel $y$, formed upon the circumference of this cap $m$; but we may rotate this cap by any other suitable arrangement.

By suitably connecting the controlling mechanism of the two pulleys so that one will decrease in diameter while the other increases, the diameters of the two pulleys can be altered by the same movement and the desired change of speed thereby effected.

We may modify the constructional arrangement of our improved pulley in various details without departing from the spirit of this invention. The shape of the grooves or slots, for example, may be varied. On the annexed drawings the grooves in the fixed plates $b\,b$ are of a certain curvature. This shape has this advantage, that the intersection of such a groove with the corresponding rectilinear groove of the carrier-plates $d\,d$ has always a perceptibly-quadrangular form, thus furnishing a suitable support for the plates $d$ and rods $f$, held thereby. However, the actual outline of these grooves can be varied in any convenient manner while maintaining the effect described. We reserve the right to vary it under these conditions.

We claim as our invention—

1. A pulley of variable diameter comprising a shaft, a pair of plates secured thereto and having a number of similar grooves whose extremities are upon circumferences concentric with the axis, a pair of carrier-plates having grooves transverse to those of the first plates, and rods to carry the band situated between these carrier-plates and engaged in the intersecting points of the grooves, in combination with a rod and rack located within said shaft, a short shaft having a pinion engaging said rack, a bevel-pinion on said short shaft, a segmental rack on one of the carrier-plates engaging said bevel-pinion, a screw-threaded sleeve mounted upon the rack-provided rod, a cone or head at the end of the driving-shaft to engage with said sleeve, a disk on the screw-threaded sleeve and another disk on the rack-provided rod to bear upon the disk on the sleeve.

2. A variable-diameter pulley having a pair of fixed plates with grooves secured to a hollow shaft, a pair of carrier-plates also with grooves, and carriers in combination with a rack in the hollow shaft, a rack on one of the carrier-plates and pinions operatively connecting the two racks and means for operating the first said rack.

3. A variable-diameter pulley having a pair of fixed plates on a shaft, a pair of carrier-plates between the fixed plates, a rack on one of the carrier-plates extending outwardly beyond the adjacent fixed plates and operating means to engage with the rack and free of the fixed plate.

In testimony whereof we have signed our names to this specification in the presence of two subscribing witnesses.

CHARLES DESPREZ.
GEORGES LOUIS DUTHUIT.

Witnesses:
GUSTAVE DERMOND,
EDWARD P. MACLEAN.